No. 824,828. PATENTED JULY 3, 1906.
W. L. SILVEY.
SECONDARY BATTERY PLATE.
APPLICATION FILED MAR. 5, 1906.
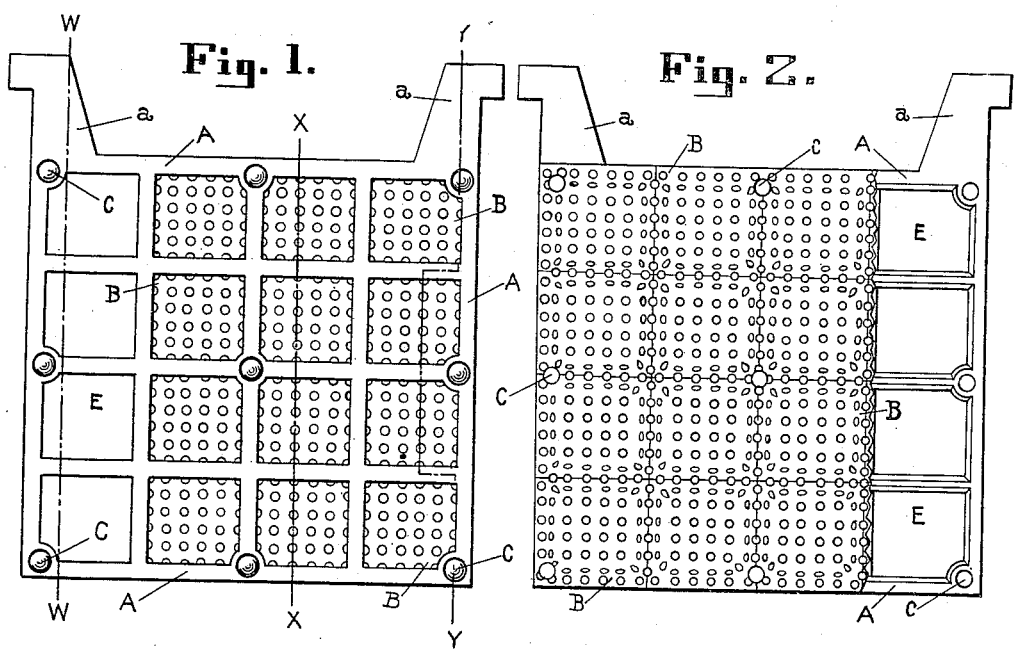
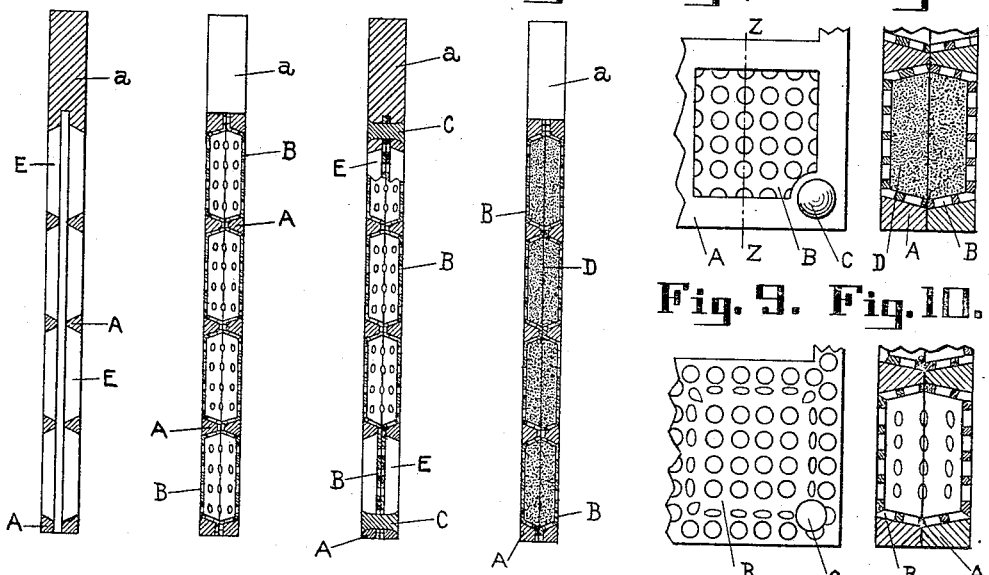
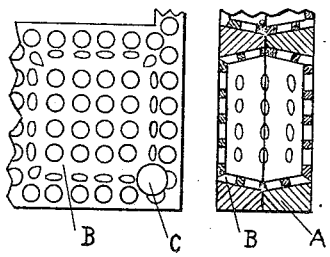
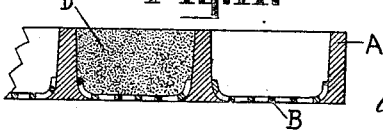
Attest
Geo. W. Frost.
J. F. Smith
Inventor
William L. Silvey

UNITED STATES PATENT OFFICE.

WILLIAM L. SILVEY, OF DAYTON, OHIO.

SECONDARY-BATTERY PLATE.

No. 824,828.  Specification of Letters Patent.  Patented July 3, 1906.

Application filed March 5, 1906. Serial No. 304,364.

*To all whom it may concern:*

Be it known that I, WILLIAM L. SILVEY, a citizen of the United States, residing in the city of Dayton, county of Montgomery, and State of Ohio, have invented certain new and useful Improvements in Secondary-Battery Plates, of which the following is a specification.

My invention relates principally to a secondary-battery plate or conducting-support and means for receiving and retaining the active element of a battery in a more permanent and substantial manner than has been heretofore employed.

It further relates to a device which will admit of the electrochemical action in a more perfect manner than in battery-plates generally employed in which mechanically-applied active material is retained in pockets.

Another object is to produce a battery-plate which is not only cheap to produce, but also durable and very efficient, and one which is not easily disintegrated by a violent electrochemical action, such as takes place in very rapid charging and discharging of plates.

Referring to the accompanying drawings, which are made a part hereof, in which similar letters of reference refer to similar parts throughout, Figure 1 is an external view of one of my improved battery-plates with part of the retaining-pockets in which the active material is confined omitted, so as to show the construction of the support-plate. Fig. 2 is an interior or reverse view of the same plate, showing one-half of the plate with the pockets B in position. Fig. 3 is a vertical cross-section of Fig. 1 along the dotted line W W. Fig. 4 is a vertical cross-section of Fig. 1 along the dotted line X X, showing the pockets B in position with the active material D omitted. Fig. 5 is a vertical cross-section of Fig. 1 along the dotted line Y Y. Fig. 6 represents a vertical cross-section similar to that shown in X X of Fig. 1, but with the active material, spongy lead or lead oxids, in place. Fig. 7 is an enlarged front view of one corner of the battery-plate similar to that in the lower right-hand corner of Fig. 1. In this view only one pocket or receptacle is shown. Fig. 8 is a cross-sectional view of Fig. 7 along the dotted line Z Z. Fig. 9 is a broken-away corner enlarged interior view of one-half of a pocket of the battery-plate constructed in the manner as shown in Fig. 2. This enlargement is made with a view of more thoroughly explaining the construction of one-half of the plate. Fig. 10 is a vertical cross-section of Fig. 7 with the active material D omitted in order to show the construction of the pockets in which the active material is confined; and Fig. 11 is an enlarged section of two perforations in one-half of a plate, showing a modification in the shape of the perforations in the perforated sheet B and also in the shape of the support-plate A, one hole filled with active material D, a flange on the edge of the hole in the grid A retaining the perforated plate B in position, as shown.

Heretofore I have made perforated battery-plates A, in which receptacles are formed by either making a perforated plate similar to that shown in the left-hand side of Fig. 1 or as shown in sectional view, Fig. 3, depending entirely on the adhesive qualities of the active material to maintain itself in place. After the battery has been charged a number of times this active material becomes more or less peroxidized or more divided and soft and is not well retained. Therefore the object of this invention is to provide a means whereby the active material after becoming soft will still remain in place. The means adopted for accomplishing this object is fully set forth in the drawings.

It will be observed that the plate or support consists of two grids having perforations extending through them. Each half of the grid has its cross-bars tapering toward the center, the openings being largest on the interior side, and the two halves of the grid being united together by means of lead-burning or preferably rivets, as shown in the several figures. Before the plates are riveted together perforated sheet-lead is pressed into shape, so as to make a series of pockets, these pockets B corresponding in size and configuration to the perforations in each half of the plate, the pockets B of perforated metal being largest on their open side. After the pockets B have been made and placed in the perforations in the plate A they are filled with active material D of a suitable character to retain the electrical charge, and the two halves of the plate are then placed together and riveted. The sheet-lead pocket B is perforated with numerous perforations, preferably about one-hunderd and forty-four to the square inch in practice. These perforations are sufficiently small to not allow an excessive amount of active material D to become dislodged. At the same time there is sufficient opening to allow the electrochemical action to take place and the electrolyte to circulate and the gases to get away.

Referring to the drawings, the grid is represented by A, holes in the grid-plate by E, the perforated sheet-lead pockets by B, the rivets by C, and the active material by D. Means for connecting the battery-plates to the external circuit and for supporting them, if required, are accomplished by means of ears $a$, which may be cast as a part of the plate or attached after they have been made.

In practice the battery-grid A is composed of two similarly-constructed halves, each tapering toward the center, as shown in Figs. 3 to 10. Into the perforations of each half there is pressed perforated sheet-lead cups B, corresponding in shape to the perforations in the plates. The perforations in the upper plate A may be any convenient shape; but I have found a substantially square outline best suited as regards to economy and convenience. The depth of the cups B should be such as to allow good circulation of the electrolyte, so as to keep the active material D thoroughly saturated and to allow of the free ingress and egress of the gases, so as to permit of economical electrochemical action. The perforations in the cup B may be of any convenient size or configuration; but practice has demonstrated the advisability of numerous small holes, also that the thickness of the perforated metal in the cup should be sufficiently thick that it will not be readily broken down by chemical action during the life of the plate, it being the object of this invention to produce an extremely durable battery. It will be observed that the perforated sheet-metal cups B are flanged, so that they will not be dislodged or get loose in the perforations in the support-plate A during the expansion of the active material D, which necessarily occurs during repeated chargings. The expansion of the active material D forces the perforated pockets B more firmly into the perforated support-plate A, making better contact. At the same time the pocket, being of sheet-lead, will stretch to accommodate itself to the expanded condition of the active material.

Having explained the mechanical details of my apparatus, I will now explain how I proceed to assemble it.

The battery-grid A may be punched out of a solid sheet, but is preferably cast. After the grid A has been made it is placed face down on a suitable platen and the perforated lead pockets B placed in position in the holes in the grid. I next fill the pockets with suitable active material D or material adapted to become active by being charged by means of an electric current. This active material may be applied dry by means of pressure or filled into place in the form of paste by mixing the finely-divided material D with water or water mixed with acid. After a sufficient number of these plates have been prepared they are assembled in pairs by placing the open sides of the cups together, as shown in section, Fig. 6, and firmly pressed together and either lead-burned, but preferably riveted together by means of suitable rivets C. The plate is now ready to have the connecting-ears $a$ applied either by soldering, riveting, lead-burning, or they may be cast or formed as a part of the plate A, as may be found most desirable; but in practice I have found it desirable to apply the ear $a$ after the body of the plate has been finished.

Having described the essential features of my invention, what I claim as new, and wish to secure by Letters Patent in the United States, is—

1. In a secondary battery a perforated battery-plate consisting of two lead plates having holes in them larger on the inside, perforated metal cups fitted into the holes in the perforated lead plates, the perforated lead plates fastened together forming perforated cavities for active material, and connecting-ears on the plate for connecting it to an external circuit as set forth.

2. In a secondary battery the combination of a perforated grid having holes in its sides, perforated pockets in the holes in the grid and active material held in place in the perforations in the grid by the perforated pockets, the pockets in the grid being smaller on the outside face as set forth.

3. A secondary-battery plate consisting of two perforated grids united together, the holes in the grid being smaller at the outside of the plate, a covering for the outer face of the hole in the grid consisting of a perforated pocket formed so as to be retained in place by its shape with relation to the hole in the grid and active material in the pocket thus formed as set forth.

4. A secondary-battery plate consisting of a two-part outer supporting-grid, perforated pockets inserted into openings in the outer supporting-grid, the pockets open on their inner side, active material in the perforated pockets and a fastening for the grids whereby the whole is secured together, as set forth.

5. In a secondary-battery plate the combination of the duplex grid A, perforated sheet-metal pockets B, held in holes E in the grid A, rivets C for holding the two sides of the grid A together and retaining the pockets in place, the active element D of the plate and an ear $a$ for connecting the completed plate to the external circuit as set forth.

In testimony whereof I have hereto set my hand in the presence of two subscribing witnesses.

WILLIAM L. SILVEY.

Witnesses:
GEO. W. FROST,
EDWARD L. SPENCER.